E. S. WOODS.
ANTIFRICTION BEARING.
APPLICATION FILED APR. 23, 1908.
981,906.
Patented Jan. 17, 1911.
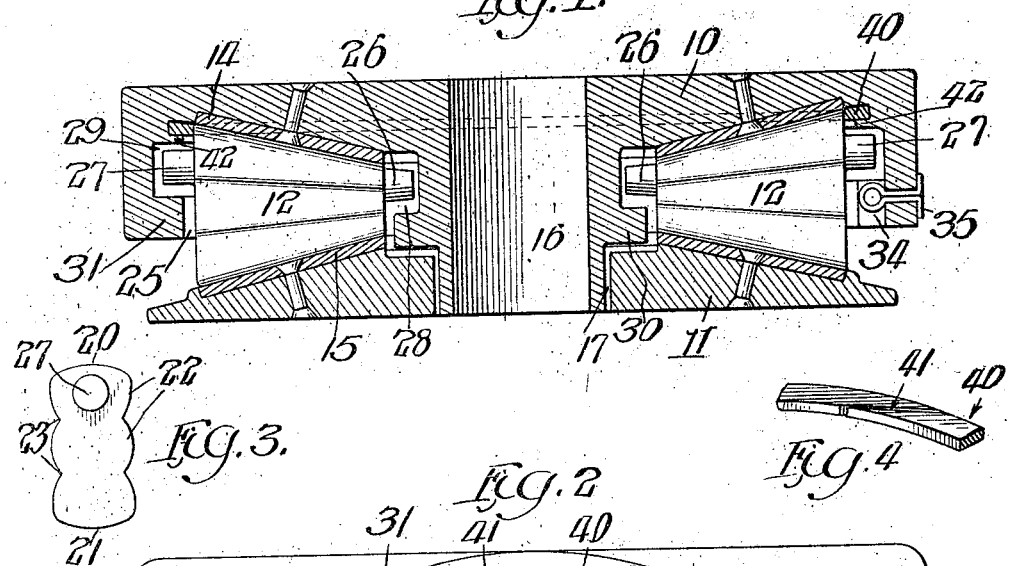
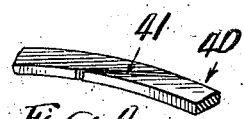
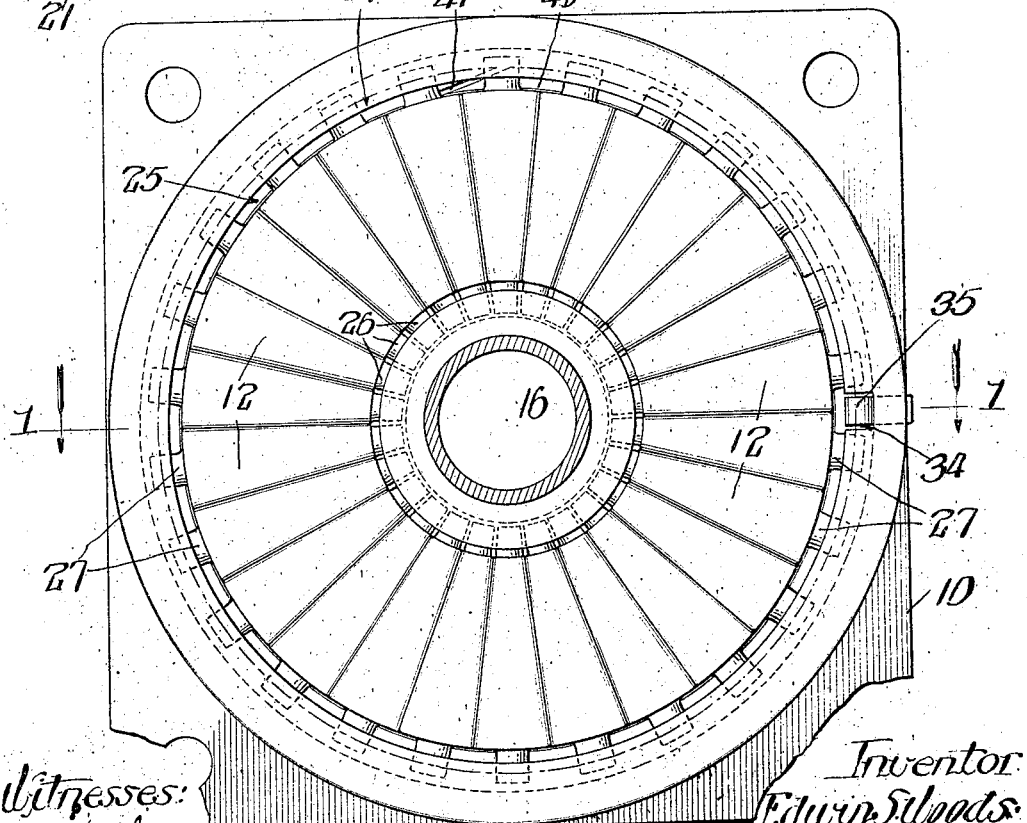
Inventor
Edwin S. Woods.

UNITED STATES PATENT OFFICE.

EDWIN S. WOODS, OF CHICAGO, ILLINOIS.

ANTIFRICTION-BEARING.

981,906.     Specification of Letters Patent.      Patented Jan. 17, 1911.

Application filed April 23, 1908. Serial No. 428,769.

*To all whom it may concern:*

Be it known that I, EDWIN S. WOODS, a citizen of the United States, and a resident of Chicago, in the county of Cook and State of Illinois, have invented certain new and useful Improvements in Antifriction-Bearings; and I do hereby declare that the following is a full, clear, and exact description thereof, reference being had to the accompanying drawings, and to the letters of reference marked thereon, which form a part of this specification.

This invention relates to improvements in an antifriction bearing and is shown as embodied in an antifriction center bearing for railway cars.

Certain features of the invention are adapted to other and more general uses.

The invention consists in the matters hereinafter set forth and more particularly pointed out in the appended claims.

Among the objects of the invention is to improve and simplify the construction of bearings of the type herein shown and to provide a construction which facilitates the assemblage of the bearing in a car or other place of use and its removal therefrom.

Other objects of the invention will appear from the following description.

In the drawings:—Figure 1 is an axial vertical section of a center bearing made in accordance with my invention, taken on line 1—1 of Fig. 2. Fig. 2 is a bottom plan view of the upper bearing member and the antifriction elements supported therein. Fig. 3 is an end view of one of the antifriction elements. Fig. 4 is a fragmentary view of a thrust ring constituting part of the bearing.

As shown in the drawings, 10 designates the upper member and 11 the lower member of a center bearing, and 12, 12 designate a plurality of radially arranged, inwardly tapered antifriction elements interposed between said upper and lower members and arranged for contact at their upper and lower sides with annular, inwardly inclined bearing surfaces on the adjacent sides of the bearing members. The inclined bearing surfaces of said upper and lower members are formed on annular, radially inclined wear plates 14, 15, respectively, which are attached to said bearing members by rivets or the like. The upper bearing member is provided centrally with a hub portion 16 which extends downwardly into a central opening 17 of the lower member, said hub being designed to receive the king pin of the bolster and itself having bearing in the lower member.

The antifriction elements herein shown are made like those illustrated in my prior application for U. S. Letters Patent No. 391,039, filed September 3rd, 1907, in that their adjacent sides are flattened or cut away, and they are nested closely together in the annular space or chamber between the upper and lower bearing members to provide a maximum linear contact between the bearing members and antifriction elements. The particular form of antifriction element shown comprises upper and lower bearing arcs 20, 21 adapted for contact with the wear plates of the upper and lower members, respectively, and flattened sides which are formed with transversely curved lateral surfaces 22, 22 and intermediate concave surfaces 23; the convex surfaces of each antifriction element being adapted to engage corresponding convex surfaces of a contiguous antifriction element to admit of close spacing of said antifriction elements. The said concave and convex bearing surfaces are arranged to afford stops, when the antifriction elements assume their greatest inclination from their normal or central positions, to arrest further movement of the antifriction elements. Said antifriction elements are adapted to be locked or confined in one of the bearing members in such manner that the bearing members may be separated from each other without disarranging the antifriction elements, the latter being maintained in their relative positions in the bearing member in which they are confined. As herein shown, said antifriction elements are suspended in the upper bearing member 10. To this end said upper bearing member is cored out to form a chamber 25 which partially receives the antifriction elements and said antifriction elements are provided at their inner and outer ends with lugs 26, 27 which enter annular recesses 28, 29 at the inner and outer sides of the chamber 25, respectively, the lower walls 30, 31 of which recesses constitute ledges which are adapted to engage said lugs in a manner to confine and suspend said antifriction elements in said bearing member. The said lugs 26, 27 of the antifriction elements are shown as located eccentric to the axes of oscillation of the latter, being in the present construction located above such axes. Thus, when the antifriction elements are suspended by their end lugs in the upper bearing member and out of contact with the lower bearing member they assume their proper relative positions by gravity, which greatly facilitates the assembling and application of the bearing as a whole.

The outer lug engaging flange or ledge 31 is provided with a notch 34 through which the lugs at the outer, larger ends of some of the antifriction elements may pass when they are being inserted into the chamber 25; the said upper bearing member being inverted preparatory to placing the antifriction elements therein. Some of the antifriction elements may be inserted in place by inclining the same from their radial positions to such extent that the lugs will pass the ledges 30 and 31. When the chamber becomes so full that the antifriction elements cannot be inclined to such position, the remainder thereof will be inserted into the chamber by first inserting the inner lugs 26 into the inner channel or recess 28 at a point opposite to the notch 34 formed in the outer ledge and thereafter passing the outer lugs 27 through said notch 34. Said notch 34 is normally closed by a key 35 which, as herein shown, has the form of an ordinary flat cotter pin, the head of which is located in said notch and the ends of which are bent outwardly against the lateral face of the upper bearing member, as shown in Fig. 1.

The lower bearing member may be flangeless at its outer margin, and tapered downwardly and outwardly, from its upwardly facing, tapered bearing surface in order to permit dust or grit which may find its way between the antifriction elements and bearing members to freely fall or pass therefrom. The bearing member which carries the antifriction elements, the upper bearing member as herein shown, is provided at the outer side of its chamber with a narrow thrust shoulder which is adapted for engagement with the outer larger ends of the antifriction elements and which takes the thrust due to the downward pressure on the tapered antifriction elements. Said shoulder is herein shown as formed by the inner margin of a thrust ring 40 which is made separate from and inserted into a suitable annular recess formed in the upper part of said chamber just above the trunnion recess 29. In order that said ring may be inserted into said annular recess or groove past the ledge 42 below the same, said ring is split or broken at a point in its circumference, as shown at 41 in Fig. 4, so that the ends of the split ring may be pressed past each other in a manner to reduce the diameters of the ring sufficiently to allow it to pass said shoulder. Thereafter the ring expands outwardly and closely fits in its seat or groove. The outer, larger ends of said antifriction elements are horizontally curved to correspond with the curvature of the inner margin of the thrust ring, against which they bear, as shown in Fig. 2.

It will be understood that the structural details of the bearing herein above described may be varied within the scope of my invention and I do not limit myself to said details except as hereinafter made the subject of specific claims.

I claim as my invention:—

1. An antifriction bearing comprising upper and lower bearing members, and an interposed circular series of closely nested antifriction elements, each adapted to lie partially within the projected plan of an adjacent element, and arranged to support each other for operative contact with the bearing members, one of the bearing members being provided with means which engage the ends of said antifriction elements to lock the latter in said bearing member.

2. An antifriction bearing comprising upper and lower bearing members, and an interposed circular series of closely nested antifriction elements, each adapted to lie partially within the projected plan of an adjacent element, and arranged to transmit rolling or rocking movement one to the other; said antifriction elements being provided at their ends with lugs which engage one of the bearing members in a manner to confine the antifriction elements therein.

3. An antifriction bearing comprising upper and lower bearing members and an interposed circular series of closely nested antifriction elements having upper and lower curved bearing surfaces and generally parallel adjacent sides, arranged with their sides close together; one of the bearing members being provided with means which engage the ends of said antifriction elements to lock the latter in said bearing member.

4. An antifriction bearing comprising upper and lower bearing members and interposed, closely nested radially arranged, inwardly tapering antifriction elements, the adjacent sides of which are flattened, one of said members being provided with inner and outer recesses and the antifriction elements having at their ends endwise extending lugs which enter said recesses.

5. An antifriction bearing comprising upper and lower bearing members and an interposed circular series of closely nested antifriction elements having flattened sides and suspended at their ends in said upper bearing member.

6. An antifriction bearing comprising upper and lower bearing members and an interposed circular series of closely nested, radial, inwardly tapering antifriction elements flattened at their sides and suspended in said upper bearing member.

7. An antifriction bearing comprising upper and lower bearing members, and an interposed circular series of closely nested antifriction elements, each adapted to lie within the projected plan of an adjacent element, said antifriction elements being suspended at their ends in said upper bearing member.

8. An antifriction bearing comprising upper and lower closely nested, radially arranged antifriction elements having flattened sides, arranged for contact with each other, one of the bearing members being chambered to partially receive said antifriction elements and provided at the inner and outer sides of its chamber with inner and outer annular recesses or grooves, and the antifriction elements being provided at their ends with lugs which enter said recesses or grooves.

9. An antifriction bearing comprising upper and lower bearing members and interposed, closely nested, radially arranged, inwardly tapering antifriction elements having flattened adjacent sides arranged for contact with each other and provided at their ends with endwise extending lugs, the upper member being formed to provide a downwardly opening chamber to receive the upper parts of the antifriction elements and at the inner and outer sides of said chamber with annular recesses to receive said lugs, the lower walls of which recesses constitute ledges from which the antifriction elements are adapted to be suspended.

10. An antifriction bearing comprising upper and lower bearing members, an interposed circular series of closely nested, radially arranged, inwardly tapering antifriction elements having flattened adjacent sides and provided at their ends with endwise extending lugs, the upper member being formed to provide a downwardly opening chamber to receive the upper parts of the antifriction elements and at the inner and outer sides of said chamber with annular recesses to receive said lugs, the lower walls of which recesses constitute ledges from which the antifriction elements are adapted to be suspended, one of said ledges being notched to permit the end lugs of the antifriction elements to pass therethrough, and means for closing said notch.

11. An antifriction center bearing comprising upper and lower bearing members rotative about an axis lying within them and interposed antifriction elements radial to said axis suspended at their ends in said upper bearing member by means permitting said antifriction elements to gravitate to vertical positions when released from said lower bearing member.

12. An antifriction center bearing comprising upper and lower bearing members rotative about an axis lying within them and interposed antifriction elements radial to said axis provided at their ends with eccentrically disposed, endwise extending lugs by which said antifriction elements are supported in said upper bearing member.

13. An antifriction bearing comprising upper and lower bearing members, and interposed, radially arranged, inwardly tapering antifriction elements, provided at their ends with endwise extending lugs arranged above the axes of oscillation thereof, the upper bearing member being formed to provide inner and outer recesses adapted to receive said lugs to suspend said antifriction elements therein.

14. An antifriction bearing comprising upper and lower bearing members, and interposed, closely nested, radially arranged antifriction elements, flattened at their sides and provided at their ends with eccentrically disposed, endwise extending lugs by which said antifriction elements are suspended in said upper bearing member.

15. An antifriction bearing comprising upper and lower bearing members, interposed, radially arranged, inwardly tapering antifriction elements, and a thrust ring removably mounted in one of said bearing members adapted for engagement with the outer ends of the antifriction elements at one side of the axes of oscillation thereof.

16. An antifriction bearing comprising upper and lower bearing members, interposed, radially arranged, inwardly tapering antifriction elements, and a thrust ring mounted in one of said bearing members adapted for engagement with the outer, larger ends of the antifriction elements at one side of the axes of oscillation thereof; said outer ends of the antifriction elements being horizontally curved to correspond with the engaging curved surface of the thrust ring.

In testimony, that I claim the foregoing as my invention I affix my signature in the presence of two witnesses, this 21st day of April A. D. 1908.

EDWIN S. WOODS.

Witnesses:
WILLIAM L. HALL,
GEORGE R. WILKINS.